UNITED STATES PATENT OFFICE.

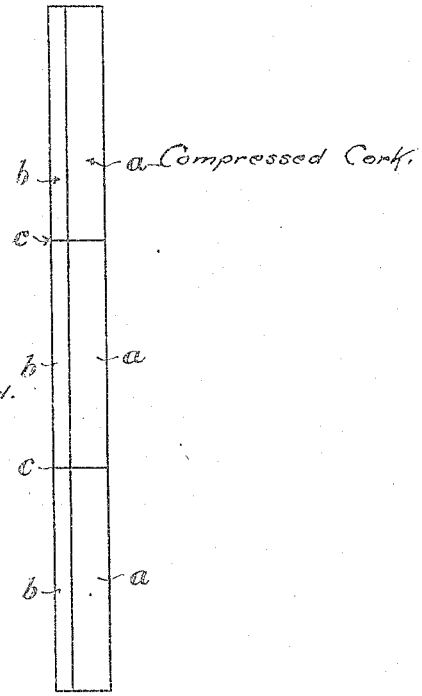

JOHN DAVIES, OF LIVERPOOL, AND WILLIAM H. JONES, OF WALLASEY, ENGLAND.

MANUFACTURE OF HEAT-INSULATING CHAMBERS, WALLS, FLOORS, AND CEILINGS.

1,304,267. Specification of Letters Patent. Patented May 20, 1919.

Application filed March 2, 1916. Serial No. 81,752.

*To all whom it may concern:*

Be it known that we, JOHN DAVIES and WILLIAM HENRY JONES, subjects of the King of Great Britain, residing, respectively, in Liverpool, in the county of Lancaster, and Wallasey, in the county of Chester, in the Kingdom of England, have invented certain new and useful Improvements in or Relating to the Manufacture of Heat-Insulating Chambers, Walls, Floors, and Ceilings, of which the following is a specification.

This invention relates to a system for making insulating surfaces, rooms and the like.

At present insulation is largely made of compressed cork. The pieces of cork unite together by the slight decomposition of the cork under heat, producing sufficient cementitious matter to bind the whole together.

Rooms and floors have been repeatedly made of more or less fibrous material coated over with cement, but our invention consists in forming solid blocks of a tough organic material such as compressed cork, and forming on the surface of these squared blocks or plates or tiles, a hard or smooth surface of cement, which from its own nature attaches itself firmly to the organic layers. These blocks are then built up whether in a floor, a ceiling or in walls, just as ashler masonry or brick may be, only we prefer to use precisely the same cement that forms the outer layer or layer open to the atmosphere.

Part of a partition, wall or ceiling, according to the present invention, is illustrated in the drawing, in which *a* is the part of the block formed of cork, while *b* is the cement covering or coating for the same. The integral blocks formed by the parts *a b* are set up in position and the interstices are filled with a grouting of cement *c* which preferably is of similar nature to the portion *b* of the block.

The cement which we prefer to use is the well known mixture of calcined magnesite, chlorid of magnesium and sawdust, or other like fibrous material, the chlorid of magnesium and magnesia acting on each other to form oxychlorid of magnesium, while the sawdust, hair or other material that is mixed with it makes it extremely tough. The outer surface is polished with a trowel or otherwise. A grouting of oxychlorid cement is now used instead of mortar to cement the blocks all solidly to each other.

One advantage of this system of building for instance cold storage rooms, is this. If the material be worked up in the ordinary manner with soft cement, it takes a very long time to dry, but our blocks can be made at the factory, dried, and brought at once to the room, and the only moisture to be dried out is the small amount in the grouting between the blocks. The magnesium cement too makes almost a polished surface, and consequently is much cheaper than when it is made in ordinary Portland cement, and then plastered up afterward, besides of course greatly lessening the time of drying. Lastly, our grouting formed of the same cement as the outer portion of the blocks themselves, when it dries the joint can be made actually unobservable, though as a rule we prefer to point out, so as to make the whole resemble ashler masonry.

We declare that what we claim is:—

1. A method of lining the surface of heat insulating chambers, which consists in shaping and forming the body portion of a slab of tough organic material and coating one side of said slab with oxychlorid composition and drying said coating, assembling said preformed dried and finished unit slabs and grouting the sides of said unit slabs with a relatively small quantity of oxychlorid cement, said cement quickly drying, thereby forming a continuous water resisting surface for said chamber.

2. A method of lining the surfaces of heat insulating chambers which consists in shaping and forming the body portion of a slab of comminuted cork by heat and pressure and coating one side of said slab with an oxychlorid composition and drying said coating, assembling said preformed dried and finished unit slabs, and grouting the sides of said unit slabs with a relatively small quantity of oxychlorid cement, said cement quickly drying, thereby forming a continuous water resisting surface for said chamber.

3. In heat insulating chambers, an assembly of preformed dried and finished unit cork slabs faced with an oxychlorid composition and united by a relatively small amount of grouting of oxychlorid cement, thereby forming a continuous water resisting surface.

In witness whereof, we have hereunto signed our names this 7th day of February 1916, in the presence of two subscribing witnesses.

JOHN DAVIES.
W. H. JONES.

Witnesses:
 JOHN VICTOR ARMSTRONG,
 MYLES HAILES.